(12) United States Patent
Sak et al.

(10) Patent No.: US 10,431,206 B2
(45) Date of Patent: Oct. 1, 2019

(54) MULTI-ACCENT SPEECH RECOGNITION

(71) Applicant: Google LLC, Mountain View, CA (US)

(72) Inventors: Hasim Sak, New York, NY (US);
Kanury Kanishka Rao, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 241 days.

(21) Appl. No.: 15/243,838

(22) Filed: Aug. 22, 2016

(65) Prior Publication Data

US 2018/0053500 A1    Feb. 22, 2018

(51) Int. Cl.
| | |
|---|---|
| *G10L 15/00* | (2013.01) |
| *G10L 15/16* | (2006.01) |
| *G10L 15/02* | (2006.01) |
| *G10L 15/06* | (2013.01) |
| *G10L 25/30* | (2013.01) |
| *G10L 15/187* | (2013.01) |

(52) U.S. Cl.
CPC .............. *G10L 15/16* (2013.01); *G10L 15/02* (2013.01); *G10L 15/063* (2013.01); *G10L 15/187* (2013.01); *G10L 25/30* (2013.01); *G10L 2015/025* (2013.01)

(58) Field of Classification Search
CPC combination set(s) only.
See application file for complete search history.

(56) References Cited

U.S. PATENT DOCUMENTS

2004/0039570 A1* 2/2004 Harengel ............... G10L 13/08
704/232

2006/0020462 A1* 1/2006 Reich .................... G10L 15/187
704/254

OTHER PUBLICATIONS

Graves et al., "Connectionist Temporal Classification: Labelling Unsegmented Sequence Data with Recurrent Neural Networks," (2006) [online] (retrieved from http://www.machinelearning.org/proceedings/icml2006/047_Connectionist_Tempor.pdf), 8 pages.
Sak et al., "Long Short-Term Memory Based Recurrent Neural Network Architectures for Large Vocabulary Speech Recognition," (Feb. 5, 2014) [online] (retrieved from http://arxiv.org/pdf/1402.1128v1.pdf), 5 pages.

* cited by examiner

*Primary Examiner* — Vu B Hang
(74) *Attorney, Agent, or Firm* — Fish & Richardson P.C.

(57) ABSTRACT

Methods, systems, and apparatus, including computer programs encoded on computer storage media for training a hierarchical recurrent neural network (HRNN) having a plurality of parameters on a plurality of training acoustic sequences to generate phoneme representations of received acoustic sequences. One method includes, for each of the received training acoustic sequences: processing the received acoustic sequence in accordance with current values of the parameters of the HRNN to generate a predicted grapheme representation of the received acoustic sequence; processing an intermediate output generated by an intermediate layer of the HRNN during the processing of the received acoustic sequence to generate one or more predicted phoneme representations of the received acoustic sequence; and adjusting the current values of the parameters of the HRNN based at (i) the predicted grapheme representation and (ii) the one or more predicted phoneme representations.

20 Claims, 3 Drawing Sheets

MULTI-ACCENT SPEECH RECOGNITION

BACKGROUND

This specification relates to speech recognition systems.

Some speech recognition systems include a pronunciation modeling system that receives a transcription of one or more words and generate a pronunciation for the words. For example, the pronunciation generated by the pronunciation modeling system for a given word may be a sequence of phonemes that the pronunciation modeling system has classified as representing the transcribed word. A pronunciation modeling system can be used in conjunction with, for example, a speech recognition system or a language modeling system.

SUMMARY

This specification describes systems and methods for training a multi-accent grapheme-based acoustic model for speech recognition using a hierarchical recurrent neural network architecture. The model is trained in a multi-task learning setting using a multi-accent data set and learns to align utterances with phonetic transcriptions in a lower neural network layer and grapheme transcriptions in a final neural network layer.

In general, one innovative aspect of the subject matter described in this specification can be embodied in methods for training a hierarchical recurrent neural network (HRNN) having a plurality of parameters on a plurality of training acoustic sequences to generate phoneme representations of received acoustic sequences, the method including the actions of, for each of the received training acoustic sequences: processing the received acoustic sequence in accordance with current values of the parameters of the HRNN to generate a predicted grapheme representation of the received acoustic sequence; processing an intermediate output generated by an intermediate layer of the HRNN during the processing of the received acoustic sequence to generate one or more predicted phoneme representations of the received acoustic sequence; and adjusting the current values of the parameters of the HRNN based on (i) the predicted grapheme representation and (ii) the one or more predicted phoneme representations.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the plurality of training acoustic sequences comprises training acoustic sequences from one or more dialects of a same natural language.

In some implementations the received acoustic sequence comprises a respective acoustic feature representation at each of a plurality of time steps, and wherein the predicted grapheme representation of the received acoustic sequence comprises a set of grapheme scores for each of the plurality of time steps, the set of grapheme scores for a time step comprising a respective grapheme score for each of a plurality of vocabulary graphemes and a blank character grapheme, the grapheme score for each vocabulary grapheme representing a likelihood that the vocabulary grapheme represents an utterance representing the acoustic sequence at the time step and the score for the blank character grapheme representing a likelihood that the utterance at the time step represents a transition from one word to another word.

In some implementations the received acoustic sequence comprises a respective acoustic feature representation at each of a plurality of time steps, and wherein a respective phoneme representation for the acoustic feature representation comprises a respective set of phoneme scores for each of the plurality of time steps, the respective set of phoneme scores for a time step comprising a respective phoneme score for each of a plurality of vocabulary phonemes, the phoneme score for each vocabulary phoneme representing a likelihood that the vocabulary phoneme represents an utterance representing the acoustic sequence at the time step.

In some implementations the HRNN comprises (i) one or more recurrent neural network layers, (ii) a grapheme output layer, and (iii) one or more phoneme output layers.

In some implementations the one or more recurrent neural network layers comprise long short term memory (LSTM) neural network layers.

In some implementations the LSTM neural network layers comprise bidirectional LSTM (BLSTM) neural network layers.

In some implementations the BLSTM layers are stacked and at each depth two LSTM layers are fully connected to two LSTM layers at a next adjacent depth.

In some implementations the one or more phoneme output layers comprise softmax output layers.

In some implementations processing the received acoustic sequence in accordance with current values of the parameters of the HRNN to generate a predicted grapheme representation of the received acoustic sequence comprises processing the received acoustic sequence through each of the recurrent neural network layers and grapheme output layer to generate the predicted grapheme representation of the received acoustic sequence.

In some implementations processing an intermediate output generated by an intermediate layer of the HRNN during the processing of the received acoustic sequence to generate one or more predicted phoneme representations of the received acoustic sequence comprises processing the intermediate output using one or more of the phoneme output layers to generate one or more respective predicted phoneme representations of the received acoustic sequence.

In some implementations each of the one or more phoneme output layers is configured to generate as output a respective predicted phoneme representation of the received acoustic sequence corresponding to a different dialect of the same natural language.

In some implementations the (i) grapheme output layer, and (ii) one or more of the phoneme output layers comprise a Connectionist Temporal Classification (CTC) loss function.

In some implementations adjusting the current values of the parameters of the HRNN based on (i) the predicted grapheme representation and (ii) the one or more predicted phoneme representations comprises: determining a dialect of the received acoustic sequence; estimating a CTC loss from (i) the grapheme output layer, and (ii) a phoneme output layer corresponding to the determined dialect; and backpropagating CTC loss gradients from (i) the grapheme output layer, and (ii) the phoneme output layer corresponding to the determined dialect to determine updated values of one or more HRNN parameters.

In some implementations backpropagating CTC loss gradients comprises optimizing a total logarithmic probability of correct grapheme representations for the acoustic sequence.

In some implementations backpropagating CTC loss gradients from (i) the grapheme output layer, and (ii) the phoneme output layer corresponding to the determined dialect comprises (i) backpropagating CTC loss gradients from the grapheme output layer to the intermediate recurrent neural network layer, and (ii) backpropagating a weighted sum of the CTC loss gradients from the grapheme output layer and the CTC loss gradients from the phoneme output layer from the intermediate recurrent neural network layer to a first recurrent neural network layer.

In some implementations the weighted sum is an equally weighted sum.

In some implementations the method further comprises initializing the one or more HRNN parameters with randomly selected initial values.

The subject matter described in this specification can be implemented in particular embodiments so as to realize one or more of the following advantages. Automatic speech recognition systems may consist of an acoustic model, pronunciation model and language model that are trained on different datasets and optimized independently. The three components may be combined, e.g., in a finite state transducer based speech recognition system, and its accuracy evaluated using word error rate.

In some cases pronunciation models include a dictionary of human transcribed word pronunciations with a grapheme-to-phoneme model as a backoff. Such dictionaries suffer from several problems. For example, dictionaries are not statistical models and unable to account for multiple pronunciations of a same word. Generally, if a word has multiple pronunciations these are simply listed as multiple entries in the dictionary. As another example, dictionaries are defined at a word level and any inter-word co-articulation effects are not considered. Furthermore, pronunciations may be defined for slow speech, whereas real-time fast speech may skip certain phonemes, and pronunciations may be defined for particular accents.

In other cases, e.g., in an end-to-end optimized system, pronunciation models may be learned along with acoustic models directly from acoustic data, e.g., using character or grapheme-based acoustic models recognizing graphemes instead of phonemes. However, the performance of grapheme-based acoustic models is often worse than phoneme-based models.

A multi-accent speech recognition system, as described in this specification, trains grapheme-based acoustic models to directly predict grapheme representations of received acoustic inputs using a hierarchical recurrent neural network with connectionist temporal classification loss. The multi-accent speech recognition system may outperform other acoustic models, e.g., phoneme-based acoustic models or non-hierarchical grapheme-based acoustic models. For example, a trained multi-accent speech recognition system as described in this specification may recognize portions of speech with a lower relative word error rate compared to other speech recognition systems.

Furthermore, unlike other speech recognition systems that are unable to capture irregularities of pronunciations for spoken words, a multi-accent speech recognition system as described in this specification may be trained on a single acoustic training data set of combined dialects of a same natural language to generate an accent-robust automatic speech recognition system. For example, the multi-accent speech recognition system may achieve high levels of performance when trained on a single acoustic training data set of multiple dialects of a same natural language and used for speech recognition tasks for data including the multiple dialects.

In addition, the multi-accent speech recognition system may be further trained using a single dialect data set to generate an adapted multi-accent speech recognition system that outperforms other speech recognition systems that were trained exclusively on a single dialect data set. Furthermore, the multi-accent speech recognition system may achieve high levels of performance when trained on a single acoustic training data set of combined dialects of a same natural language and used for speech recognition tasks for previously unseen dialects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
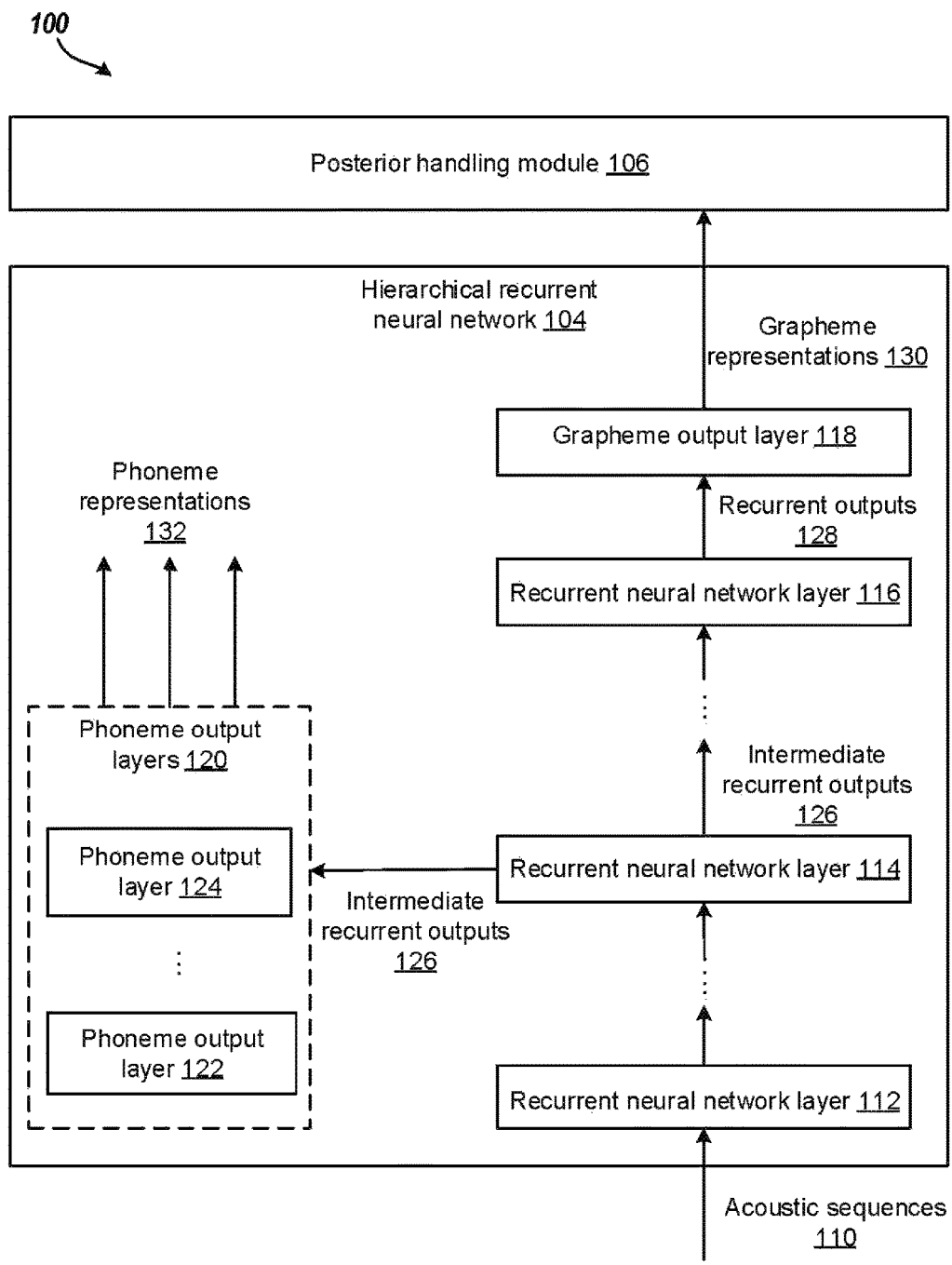
FIG. 1 is a block diagram of a multi-accent speech recognition system.

FIG. 1 is a block diagram of an example multi-accent speech recognition system 100. The multi-accent speech recognition system 100 is an example of a system implemented as computer programs on one or more computers in one or more locations, in which the systems, components, and techniques described below can be implemented.

The multi-accent speech recognition system 100 includes a hierarchical recurrent neural network (HRNN) 104. The HRNN 104 is configured to receive acoustic sequences, e.g., acoustic sequences 110, and generate corresponding predicted grapheme representations, e.g., grapheme representations 130, of the acoustic sequences.

Each received acoustic sequence may represent an utterance and include a respective acoustic feature representation at each of multiple time steps, where each acoustic feature representation characterizes the utterance at the corresponding time step. In some implementations, e.g., during training, the HRNN 104 may receive multiple acoustic sequences that represent utterances from one or more dialects of a same natural language. For example, the multiple acoustic sequences may include acoustic sequences representing utterances spoken in British-English and acoustic sequences representing utterances spoken in American-English.

The HRNN 104 includes one or more recurrent neural network layers, e.g., recurrent neural network layers 112, 114 and 116. Although three recurrent neural network layers are shown in FIG. 1 for clarity, in some implementations the HRNN 104 may include a larger number of recurrent neural network layers or a smaller number of recurrent neural network layers. At each time step, each recurrent neural network layer receives an input from another recurrent neural network layer, or, if the recurrent neural network layer is a lowest recurrent neural network layer, acoustic feature representations for the time step, and generates a recurrent output for the time step. For example, an intermediate recurrent neural network layer, e.g., recurrent neural network layer 114, may receive inputs from a preceding recurrent neural network layer and generate corresponding layer outputs, e.g., intermediate recurrent outputs 126.

The recurrent neural network layers can include one or more Long Short-Term Memory (LSTM) neural network layers. A LSTM neural network layer is a neural network layer that has one or more LSTM memory blocks. In some implementations each LSTM neural network layer is unidirectional. In some other implementations, one or more of the LSTM neural network layers may be bidirectional, i.e., LSTM neural network layers that process an input in both a forward and backward direction and model both left and right temporal context. In some cases the bidirectional LSTM layers may be stacked, where at each depth two LSTM layers (one forward and one backward) are fully connected to two LSTM layers at a next adjacent depth. An example LSTM neural network that can be used to process acoustic features is described in more detail in "Long Short-Term Memory Based Recurrent Neural Network Architectures for Large Vocabulary Speech Recognition," Haşim Sak, Andrew Senior, Françoise Beaufays, http://arxiv.org/abs/1402.1128.

The HRNN 104 further includes a grapheme output layer 118. The grapheme output layer 118 receives recurrent outputs generated by the one or more recurrent neural network layers, e.g., recurrent outputs 128, and generates respective grapheme layer outputs from the recurrent output, e.g., grapheme representations 130. In some implementations the grapheme output layer 118 is a connectionist temporal classification (CTC) layer, e.g., a layer that implements CTC techniques for sequence labelling where the alignment between inputs and target outputs is unknown.

For example, the grapheme output layer 118 may be a softmax classifier layer that processes a recurrent output for a given time step to generate a corresponding predicted grapheme representation of the recurrent output. The grapheme representation may include a set of grapheme scores for the time step. Each grapheme score may correspond to a respective grapheme from a set of graphemes. The set of graphemes may include a set of vocabulary graphemes, e.g., the lower cased English alphabet (a-z), and a blank grapheme. The set of vocabulary graphemes are a set of graphemes that may be possible grapheme representations of utterances, and do not include the blank grapheme. The score for a given vocabulary grapheme at a given time step represents a likelihood that the grapheme is a representation of the utterance at the time step. The score for the blank grapheme represents a likelihood that the utterance at the time step represents a transition from one word to another word. The sets of grapheme scores for the multiple time steps define a probability distribution over all possible grapheme labelings of input sequences. An example CTC layer is described in more detail in "Connectionist Temporal Classification: Labelling Unsegmented Sequence Data with Recurrent Neural Networks," Alex Graves, Santiago Fernández, Faustino Gomez, and Jürgen Schmidhuber, *Proceedings of the 23rd International Conference on Machine Learning*, 2006.

The HRNN 104 further includes one or more phoneme output layers 120, e.g., phoneme output layers 122 and 124. The one or more phoneme output layers are included in the HRNN during training of the HRNN in order to improve the performance of the recurrent neural network layers and grapheme output layer at runtime. Training the HRNN is described in more detail below with reference to FIGS. 2 and 3.

The one or more phoneme output layers are each configured to receive intermediate recurrent outputs generated by an intermediate recurrent neural network layer, e.g., intermediate recurrent outputs 126 generated by recurrent neural network layer 114 and generate respective phoneme layer outputs, e.g., predicted phoneme representations 132, from the intermediate recurrent outputs. For clarity the intermediate recurrent outputs 126 received by the one or more phoneme output layers 120 are generated by recurrent neural network layer 114 in FIG. 1, however the intermediate recurrent outputs may be received from any one of the recurrent neural network layers included in the HRNN 104.

In some implementations each phoneme output layer in the one or more phoneme output layers 120 corresponds to a distinct dialect of the same natural language and is configured to generate as output a respective predicted phoneme representation of an acoustic sequence received by the system 100 that was spoken in the corresponding dialect. For example, in some implementations the one or more phoneme output layers 120 may include a phoneme output layer that is configured to process received inputs and generate predicted phoneme representations corresponding to British-English and another phoneme output layer that is configured to process received inputs and generate predicted phoneme representations corresponding to American-English.

In some implementations the one or more phoneme output layers 120 include connectionist temporal classification (CTC) layers. For example, the one or more phoneme output layers 120 may include softmax classifier layers that each process an intermediate recurrent output for a given time step to generate respective sets of phoneme scores. Each phoneme score in a respective set of phoneme scores may correspond to a respective phoneme from a set of phonemes. The set of phonemes may include a set of vocabulary phonemes, e.g., the XSampa phoneset with 42 phonemes for American-English. The set of vocabulary phonemes are a set of phonemes that may be possible phoneme representations of utterances. The vocabulary phonemes for each phoneme output layer may be specific to the corresponding dialects that the phoneme output layers correspond to. For example, American-English may have a different phoneme vocabulary than British-English or Australian-English. The score for a given vocabulary phoneme represents a likelihood that the corresponding phoneme represents the received acoustic feature representation.

The HRNN 104 can be trained on training data that includes multiple training examples in order to determine trained values of parameters of the HRNN layers, i.e., to adjust the values of the parameters of the HRNN layers from initial values, i.e., randomly assigned values or predetermined initial values, to trained values. The training data may include multiple training acoustic sequences that represent transcriptions that have been converted to the spoken domain, e.g., using a verbalizer. For example, a verbalizer may be constructed manually based on language specific rules and may generate several alternative spoken transcriptions for a given written transcription, e.g., $101 may be spoken as "one hundred and one dollars" or "hundred and one dollars" or "one oh one dollars." The grapheme representation in the chosen spoken form that aligns best with the audio using a speech recognizer may be used as the grapheme targets, e.g., the grapheme representation for "hundred and one dollars" may be given by hundred <space> and <space> one <space> dollars.

The HRNN can be trained to optimize a total log probability of correct labelings for training data using HRNN outputs and backpropagation techniques, e.g., forward-backward algorithm, where correct labelings for an input training example may be defined as a set of all possible labelings of the input training example with target labels in the correct sequence (possibly with repetitions and with blank labels permitted between separate labels.)

The training data may include multiple training acoustic sequences from multiple dialects of a same natural language. For example, the multiple training acoustic sequences may include one or more training acoustic sequences that represent utterances spoken in British-English, one or more training acoustic sequences that represent utterances spoken in American-English, one or more training acoustic sequences that represent utterances spoken in Australian-English and one or more training acoustic sequences that represent utterances spoken in Indian-English. Training a hierarchical recurrent neural network for multi-accent speech recognition is described in more detail below with reference to FIGS. 2 and 3.

In some implementations the trained HRNN 104 may receive a new acoustic sequence as input and may process the received acoustic sequence through the one or more recurrent neural network layers 112, 114 and 116 and the grapheme output layer 118 to generate a predicted grapheme representation of the received acoustic sequence in accordance with the trained values of the parameters of the HRNN. The received acoustic sequence may correspond to any one of the dialects included in the training data described above.

In other implementations the trained HRNN 104 may be provided for further training on training data that includes multiple training examples from one particular dialect of the same natural language to determine further trained values of the parameters of the HRNN layers, i.e., to adjust the values of the parameters of the HRNN from values trained using multiple dialects to values further trained using a single dialect.

The multi-accent speech recognition system 100 may include a posterior handling module 106. The posterior handling module 106 receives grapheme representations of an acoustic sequence, e.g., grapheme representations 130, and generates corresponding system outputs. In some implementations, generated system outputs may be used directly as a recognized transcript. In some implementations, generated system outputs may be provided to a speech decoder for speech decoding, e.g., in combination with a language model.

Figure 2:
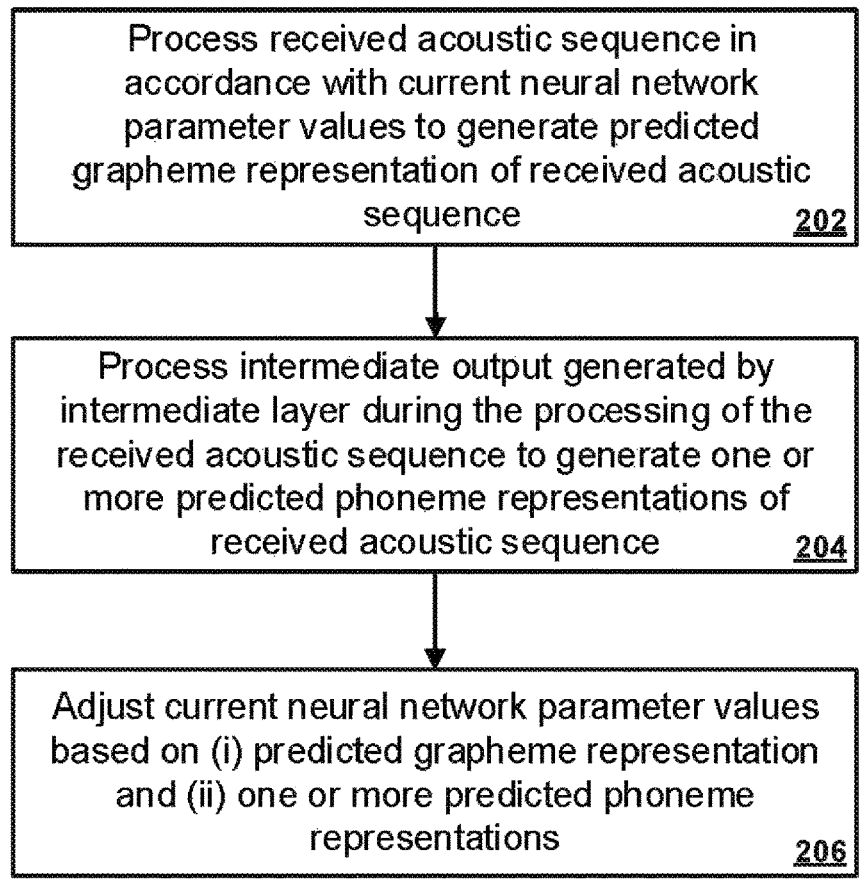
FIG. 2 is a flow diagram of an example process for training a hierarchical recurrent neural network for multi-accent speech recognition.

FIG. 2 is a flow diagram of an example process 200 for training a hierarchical recurrent neural network having multiple parameters on a received training acoustic sequence to generate grapheme representations of received acoustic sequences. For convenience, the process 200 will be described as being performed by a system of one or more computers located in one or more locations. For example, a multi-accent speech recognition system, e.g., the multi-accent speech recognition system 100 of FIG. 1 including a hierarchical recurrent neural network with one or more recurrent neural network layers, grapheme output layer and one or more phoneme output layers, appropriately programmed, can perform the process 200.

The system processes the received acoustic sequence in accordance with current values of parameters of the hierarchical recurrent neural network (HRNN) system to generate a predicted grapheme representation of the received acoustic sequence (step 202). The received acoustic sequence may represent an utterance and include a respective acoustic feature representation at each of multiple time steps. In some implementations the received acoustic sequence may be one of multiple training acoustic sequences from one or more dialects of a same natural language. For example, the multiple training acoustic sequences may include acoustic sequences representing English language utterances in at least one of a British, Australian, American or Indian dialect.

The system may process the received acoustic sequence through each of the recurrent neural network layers of the HRNN system and the grapheme output layer of the HRNN system to generate the predicted grapheme representation of the received acoustic sequence. For example, for each time step in the multiple time steps, the system may process an acoustic feature representation for the time step through each of the recurrent neural network layers and grapheme output layer to generate as output a grapheme representation of the acoustic feature representation for the time step. The generated predicted grapheme representation may include a grapheme representation for an acoustic feature representation at each time step in the multiple time steps.

In some implementations the predicted grapheme representation of the received acoustic sequence includes a set of grapheme scores for each of the multiple time steps. The set of grapheme scores for a time step may include a respective grapheme score for each of multiple vocabulary graphemes, e.g., the lower case English alphabet (a-z), and a blank character grapheme. The grapheme score for each vocabulary grapheme represents a likelihood that the vocabulary grapheme represents the utterance at the time step. The score for the blank character grapheme represents a likelihood that the utterance at the time step represents a transition from one word to another word.

The system processes an intermediate output generated by an intermediate layer of the HRNN, e.g., one of the one or more recurrent neural network layers, during the processing of the received acoustic sequence as described above with reference to step 202 to generate one or more predicted phoneme representations of the received acoustic sequence (step 204).

The system may process the intermediate output generated by the intermediate layer of the HRNN using one or more respective phoneme output layers included in the HRNN system to generate the one or more predicted phoneme representations of the received acoustic sequence. Each of the one or more phoneme output layers may be configured to process a received input, e.g., the intermediate output, to generate as output a respective predicted phoneme representation of the received acoustic sequence corresponding to a different dialect of the same natural language.

For example, as described above, the received acoustic sequence may be one of multiple training acoustic sequences that represent utterances spoken in multiple dialects of a same natural language. In this case, for each received acoustic sequence representing an utterance spoken in a particular dialect, a phoneme output layer corresponding to the particular dialect may process the corresponding intermediate output to generate a predicted phoneme representation of the acoustic sequence corresponding to the particular dialect. For example, if an acoustic sequence received by the system 100 represents an utterance spoken in Indian-English, the HRNN may process the received acoustic representation through the one or more recurrent neural network layers to generate an intermediate output for the acoustic sequence. The intermediate output may then be processed by a phoneme output layer corresponding to Indian-English to generate a phoneme representation of the acoustic sequence corresponding to Indian-English, i.e., a representation of the acoustic sequence based on Indian-English vocabulary phonemes.

As described above with reference to step 202, the received acoustic sequence may represent an utterance and include a respective acoustic feature representation at each of multiple time steps. Therefore, for each time step in the multiple time steps, the system may process an intermediate output for the time step generated by the intermediate layer of the HRNN using one or more of the one or more phoneme output layers to generate as output one or more respective phoneme representations of the acoustic feature representation for the time step. Each generated predicted phoneme representation may include a respective phoneme representation for an acoustic feature representation at each time step in the multiple time steps.

In some implementations each predicted phoneme representation of the received acoustic sequence includes a respective set of phoneme scores for each of the plurality of time steps. The respective set of phoneme scores for a time step may include a respective phoneme score for each of multiple vocabulary phonemes, e.g., the XSampa phoneset with 42 phonemes for American-English, the phoneme score for each vocabulary phoneme representing a likelihood that the vocabulary phoneme represents the utterance at the time step.

The system adjusts the current values of the parameters of the HRNN based on (i) the predicted grapheme representation and (ii) the one or more predicted phoneme representations (step 206). The system may repeat steps 202-206 for multiple training acoustic sequences, e.g., multiple training acoustic sequences from one or more dialects of a same natural language, to determine trained values of the parameters of the HRNN. Adjusting current values of the parameters of a hierarchical recurrent neural network based on (i) a predicted grapheme representation and (ii) one or more predicted phoneme representations of an acoustic sequence is described in more detail below with reference to FIG. 3.

In some implementations the trained HRNN may receive a new acoustic sequence as input and may process the received acoustic sequence to generate a predicted grapheme representation of the received acoustic sequence in accordance with the trained values of the parameters of the HRNN. The received acoustic sequence may correspond to any one of the dialects included in the training data described above with reference to step 202. In some implementations the received acoustic sequence may correspond to an utterance that is not spoken in one of the dialects that the model was trained on, i.e., a previously unseen dialect.

In other implementations the trained HRNN may be provided for further training on training data that includes multiple training examples from one particular dialect of the same natural language to determine further trained values of the parameters of the HRNN layers, i.e., to adjust the values of the parameters of the HRNN from values trained using multiple dialects to values further trained using a single dialect. For example, the system may repeat steps 202-206 using training data from one particular dialect of the same natural language.

Figure 3:
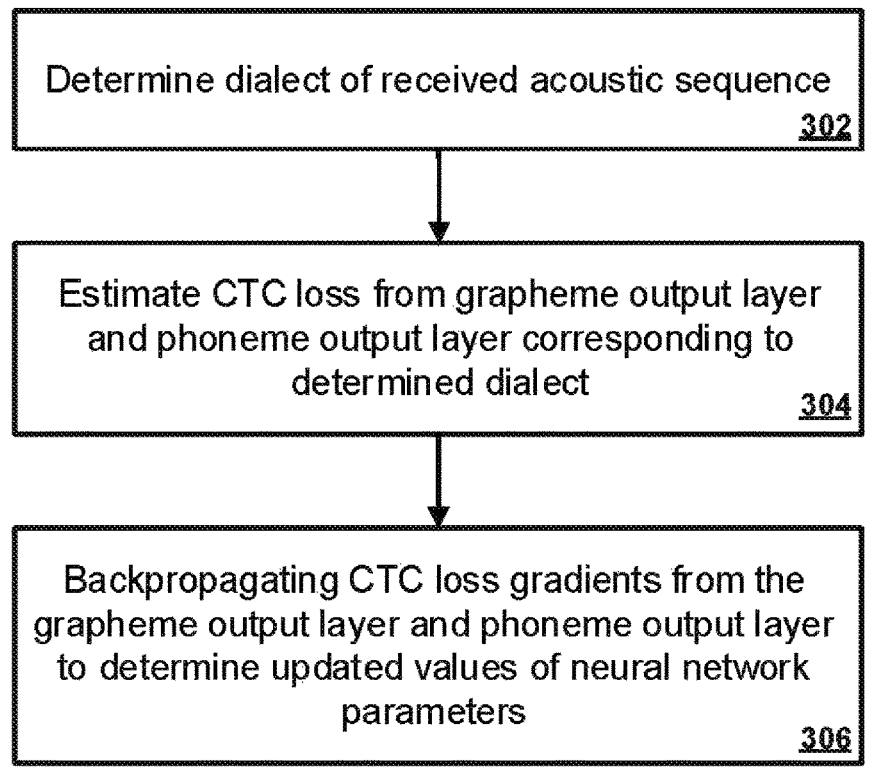
FIG. 3 is a flow diagram of an example process for adjusting current values of the parameters of a hierarchical recurrent neural network.

FIG. 3 is a flow diagram of an example process 300 for adjusting current values of the parameters of a hierarchical recurrent neural network based on (i) a predicted grapheme representation and (ii) one or more predicted phoneme representations of an acoustic sequence. For convenience, the process 300 will be described as being performed by a system of one or more computers located in one or more locations. For example, a multi-accent speech recognition system, e.g., the multi-accent speech recognition system 100 of FIG. 1 including hierarchical recurrent neural network 104 with one or more recurrent neural network layers, grapheme output layer and one or more phoneme output layers, appropriately programmed, can perform the process 300.

As described above with reference to FIG. 2, the received acoustic sequence may be one of multiple training acoustic sequences that represent utterances from one or more dialects of a same natural language, e.g., British-, Australian-, American- or Indian-English. The system determines a dialect of the received acoustic sequence (step 302). For example, each acoustic sequence in the multiple training acoustic sequences may be labeled as representing an utterance from a particular dialect of the same natural language, and the system may determine a dialect of the received acoustic sequence based on its labeling.

The system estimates a connectionist temporal classification (CTC) loss from (i) the grapheme output layer, and (ii) a phoneme output layer corresponding to the determined dialect (step 304). For example, based on the determined dialect, the system may identify a phoneme representation of the acoustic sequence generated by a respective phoneme output layer corresponding to the determined dialect and estimate a CTC loss of the identified phoneme representation generated by the respective phoneme output layer.

The system backpropagates CTC loss gradients from (i) the grapheme output layer, and (ii) the phoneme output layer corresponding to the determined dialect to determine updated values of one or more HRNN parameters (step 306). In some implementations backpropagating CTC loss gradients includes backpropagating CTC loss gradients from the grapheme output layer to the intermediate recurrent neural network layer, and backpropagating a weighted sum of the CTC loss gradients from the grapheme output layer and the CTC loss gradients from the phoneme output layer, e.g., an equally weighted sum, from the intermediate recurrent neural network layer to a first recurrent neural network layer. In other words, the CTC loss gradients for the graphemes and phonemes are summed for common neural network layers. In some implementations backpropagating CTC loss gradients may include optimizing a total logarithmic probability of correct grapheme representations for the acoustic sequence.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for training a hierarchical recurrent neural network (HRNN) having a plurality of parameters on a plurality of training acoustic sequences to perform automatic speech recognition, wherein the HRNN is configured to generate phoneme representations of received acoustic sequences, the method comprising, for each of the received training acoustic sequences:
   processing the received acoustic sequence in accordance with current values of the parameters of the HRNN to generate a predicted grapheme representation of the received acoustic sequence;
   processing an intermediate output generated by an intermediate layer of the HRNN during the processing of the received acoustic sequence to generate one or more predicted phoneme representations of the received acoustic sequence;
   adjusting the current values of the parameters of the HRNN based on (i) the predicted grapheme representation and (ii) the one or more predicted phoneme representations; and
   providing data specifying the trained HRNN for use in performing automatic speech recognition on input utterances.

2. The method of claim 1, wherein the plurality of training acoustic sequences comprises training acoustic sequences from one or more dialects of a same natural language.

3. The method of claim 1, wherein the received acoustic sequence comprises a respective acoustic feature representation at each of a plurality of time steps, and
   wherein the predicted grapheme representation of the received acoustic sequence comprises a set of grapheme scores for each of the plurality of time steps, the set of grapheme scores for a time step comprising a respective grapheme score for each of a plurality of vocabulary graphemes and a blank character grapheme, the grapheme score for each vocabulary grapheme representing a likelihood that the vocabulary grapheme represents an utterance representing the acoustic sequence at the time step and the score for the blank character grapheme representing a likelihood that the utterance at the time step represents a transition from one word to another word.

4. The method of claim 1, wherein the received acoustic sequence comprises a respective acoustic feature representation at each of a plurality of time steps, and
   wherein a respective phoneme representation for the acoustic feature representation comprises a respective set of phoneme scores for each of the plurality of time steps, the respective set of phoneme scores for a time step comprising a respective phoneme score for each of a plurality of vocabulary phonemes, the phoneme score for each vocabulary phoneme representing a likelihood that the vocabulary phoneme represents an utterance representing the acoustic sequence at the time step.

5. The method of claim 1, wherein the HRNN comprises (i) one or more recurrent neural network layers, (ii) a grapheme output layer, and (iii) one or more phoneme output layers.

6. The method of claim 5, wherein the one or more recurrent neural network layers comprise long short term memory (LSTM) neural network layers.

7. The method of claim 6, wherein the LSTM neural network layers comprise bidirectional LSTM (BLSTM) neural network layers.

8. The method of claim 7, wherein the BLSTM layers are stacked and at each depth two LSTM layers are fully connected to two LSTM layers at a next adjacent depth.

9. The method of claim 5, wherein the one or more phoneme output layers comprise softmax output layers.

10. The method of claim 5, wherein processing the received acoustic sequence in accordance with current values of the parameters of the HRNN to generate a predicted grapheme representation of the received acoustic sequence comprises processing the received acoustic sequence through each of the recurrent neural network layers and grapheme output layer to generate the predicted grapheme representation of the received acoustic sequence.

11. The method of claim 5, wherein processing an intermediate output generated by an intermediate layer of the HRNN during the processing of the received acoustic sequence to generate one or more predicted phoneme representations of the received acoustic sequence comprises processing the intermediate output using one or more of the phoneme output layers to generate one or more respective predicted phoneme representations of the received acoustic sequence.

12. The method of claim 5, wherein each of the one or more phoneme output layers is configured to generate as output a respective predicted phoneme representation of the received acoustic sequence corresponding to a different dialect of the same natural language.

13. The method of claim 5, wherein the (i) grapheme output layer, and (ii) one or more of the phoneme output layers comprise a Connectionist Temporal Classification (CTC) loss function.

14. The method of claim 13, wherein adjusting the current values of the parameters of the HRNN based on (i) the predicted grapheme representation and (ii) the one or more predicted phoneme representations comprises:
   determining a dialect of the received acoustic sequence;
   estimating a CTC loss from (i) the grapheme output layer, and (ii) a phoneme output layer corresponding to the determined dialect; and
   backpropagating CTC loss gradients from (i) the grapheme output layer, and (ii) the phoneme output layer corresponding to the determined dialect to determine updated values of one or more HRNN parameters.

15. The method of claim 14, wherein backpropagating CTC loss gradients comprises optimizing a total logarithmic probability of correct grapheme representations for the acoustic sequence.

16. The method of claim 14, wherein backpropagating CTC loss gradients from (i) the grapheme output layer, and (ii) the phoneme output layer corresponding to the determined dialect comprises:
  (i) backpropagating CTC loss gradients from the grapheme output layer to the intermediate recurrent neural network layer, and
  (ii) backpropagating a weighted sum of the CTC loss gradients from the grapheme output layer and the CTC loss gradients from the phoneme output layer from the intermediate recurrent neural network layer to a first recurrent neural network layer.

17. The method of claim 16, wherein the weighted sum is an equally weighted sum.

18. The method of claim 14, further comprising initializing the one or more HRNN parameters with randomly selected initial values.

19. A system comprising one or more computers and one or more storage devices storing instructions that, when executed by the one or more computers, cause the one or more computers to perform operations for training a hierarchical recurrent neural network (HRNN) having a plurality of parameters on a plurality of training acoustic sequences to perform automatic speech recognition, wherein the HRNN is configured to generate phoneme representations of received acoustic sequences, the operations comprising, for each of the received training acoustic sequences:
  processing the received acoustic sequence in accordance with current values of the parameters of the HRNN to generate a predicted grapheme representation of the received acoustic sequence;
  processing an intermediate output generated by an intermediate layer of the HRNN during the processing of the received acoustic sequence to generate one or more predicted phoneme representations of the received acoustic sequence;
  adjusting the current values of the parameters of the HRNN based on (i) the predicted grapheme representation and (ii) the one or more predicted phoneme representations; and
  providing data specifying the trained HRNN for use in performing automatic speech recognition on input utterances.

20. One or more non-transitory computer-readable storage media storing instructions that when executed by one or more computers cause the one or more computers to perform operations for training a hierarchical recurrent neural network (HRNN) having a plurality of parameters on a plurality of training acoustic sequences to perform automatic speech recognition, wherein the HRNN is configured to generate phoneme representations of received acoustic sequences, the operations comprising, for each of the received training acoustic sequences:
  processing the received acoustic sequence in accordance with current values of the parameters of the HRNN to generate a predicted grapheme representation of the received acoustic sequence;
  processing an intermediate output generated by an intermediate layer of the HRNN during the processing of the received acoustic sequence to generate one or more predicted phoneme representations of the received acoustic sequence;
  adjusting the current values of the para meters of the HRNN based on (i) the predicted grapheme representation and (ii) the one or more predicted phoneme representations; and
  providing data specifying the trained HRNN for use in performing automatic speech recognition on input utterances.

* * * * *

UNITED STATES PATENT AND TRADEMARK OFFICE
CERTIFICATE OF CORRECTION

PATENT NO. : 10,431,206 B2  
APPLICATION NO. : 15/243838  
DATED : October 1, 2019  
INVENTOR(S) : Sak et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this  
Thirtieth Day of June, 2020

Andrei Iancu  
*Director of the United States Patent and Trademark Office*